(12) United States Patent
Li et al.

(10) Patent No.: US 11,354,689 B2
(45) Date of Patent: Jun. 7, 2022

(54) METHODS AND SYSTEMS FOR DETERMINING AUCTION PRICES

(71) Applicant: Capital One Services, LLC, McLean, VA (US)

(72) Inventors: Yingbo Li, Plano, TX (US); Senthil Natarajan, Plano, TX (US); Mark Pond, McKinney, TX (US); Amitayu Pal, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 149 days.

(21) Appl. No.: 16/834,114

(22) Filed: Mar. 30, 2020

(65) Prior Publication Data

US 2021/0304235 A1  Sep. 30, 2021

(51) Int. Cl.
*G06Q 30/02* (2012.01)
*G06Q 30/08* (2012.01)
(Continued)

(52) U.S. Cl.
CPC ......... *G06Q 30/0206* (2013.01); *G06N 20/00* (2019.01); *G06Q 30/0224* (2013.01);
(Continued)

(58) Field of Classification Search
CPC ........... G06Q 30/0206; G06Q 30/0224; G06Q 30/0278; G06Q 30/08; G06Q 40/02; G06N 20/00
(Continued)

(56) References Cited

U.S. PATENT DOCUMENTS

| 8,595,079 B1 | 11/2013 | Raines et al. |
| 8,600,823 B1 | 12/2013 | Raines et al. |

(Continued)

FOREIGN PATENT DOCUMENTS

KR     102151811 B1 *  9/2020

OTHER PUBLICATIONS

Philip Reed, Tips and Traps When Buying a Used Car at Auction, 2019 (Year: 2019).*
(Continued)

*Primary Examiner* — Tarek Elchanti
(74) *Attorney, Agent, or Firm* — Bookoff McAndrews, PLLC

(57) ABSTRACT

A computer-implemented method for determining auction prices of vehicles may include obtaining wholesale auction price data indicative of wholesale auction prices and vehicle attribute values of a plurality of vehicles; grouping the plurality of vehicles into a plurality of vehicle groups respectively associated with a plurality of characteristics; determining a plurality of regression models respectively based on the plurality of vehicle groups; obtaining information describing a target vehicle; based on the target-vehicle values and values for the one or more economic indicators, determining an estimated wholesale auction price of the target vehicle using an identified regression model of the plurality of regression models; determining a discount factor representing an expected discount of a post-repossession auction price of the target vehicle from the estimated wholesale auction price; and determining an estimated post-repossession auction price of the target vehicle based on the estimated wholesale auction price and the determined discount factor.

19 Claims, 4 Drawing Sheets

(51) Int. Cl.
   *G06N 20/00*        (2019.01)
   *G06Q 40/02*        (2012.01)
(52) U.S. Cl.
   CPC ......... *G06Q 30/0278* (2013.01); *G06Q 30/08* (2013.01); *G06Q 40/02* (2013.01)
(58) Field of Classification Search
   USPC ....................................................... 705/7.35
   See application file for complete search history.

(56) References Cited

U.S. PATENT DOCUMENTS

2003/0200151 A1    10/2003   Ellenson et al.
2011/0270706 A1*  11/2011   Anspach ................ G06Q 30/06
                                                       705/26.61

OTHER PUBLICATIONS

ICLR, Predicting Auction Price of Vehicle License Plate With Deep Recurrent Neural Network, 2018 (Year: 2018).*

* cited by examiner

METHODS AND SYSTEMS FOR DETERMINING AUCTION PRICES

TECHNICAL FIELD

Various embodiments of the present disclosure relate generally to determining auction prices, and, more particularly, to determining auction prices for repossessed vehicles.

BACKGROUND

For auto loan lenders, hundreds of millions of dollars can be recovered by sending repossessed vehicles to vehicle auctions. Thus, understanding and forecasting such repossessed vehicles' auction prices may be critical to meet important governance criterion or to make important business decisions of corporate planning, capital reserve, and valuation strategies. Current models to predict repossessed vehicles' auction prices may be incapable of understanding the interaction between a repossessed vehicle's value and economy.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining auction prices of vehicles. The methods and systems disclosed herein may better predict the auction prices of the repossessed vehicles by not only considering depreciation of the repossessed vehicles, but also considering economic factors and market changes.

In an aspect, a computer-implemented method for determining auction prices of vehicles may include: obtaining wholesale auction price data indicative of wholesale auction prices and vehicle attribute values of a plurality of vehicles; grouping the plurality of vehicles into a plurality of vehicle groups respectively associated with a plurality of characteristics, each of the plurality of vehicle groups being a set of vehicles having the respective characteristic; determining a plurality of regression models respectively based on the plurality of vehicle groups, each of the plurality of regression models being configured to output an estimated wholesale auction price as a function of a plurality of input variables, the plurality of input variables including one or more vehicle attributes and one or more economic indicators; obtaining information describing a target vehicle, the information being indicative of target-vehicle values for the one or more vehicle attributes; based on the target-vehicle values and values for the one or more economic indicators, determining an estimated wholesale auction price of the target vehicle using an identified regression model of the plurality of regression models, that is associated with a characteristic possessed by the target vehicle; determining a discount factor representing an expected discount of a post-repossession auction price of the target vehicle from the estimated wholesale auction price; and determining an estimated post-repossession auction price of the target vehicle based on the estimated wholesale auction price and the determined discount factor.

In another aspect, a computer system for determining auction prices of vehicles may include a memory storing instructions; and one or more processors configured to execute the instructions to perform operations. The operations may include: storing a plurality of regression models derived from a plurality of datasets, each of the plurality of datasets representing vehicles having a common characteristic, each of the plurality of regression models being configured to output an estimated wholesale auction price as a function of a plurality of input variables, the plurality of input variables including one or more vehicle attributes and one or more economic indicators; obtaining information describing a target vehicle, the information being indicative of target-vehicle values for the one or more vehicle attributes; based on the target-vehicle values and values for the one or more economic indicators, determining an estimated wholesale auction price of the target vehicle using an identified regression model of the plurality of regression models, that is associated with a characteristic possessed by the target vehicle; determining a discount factor representing an expected discount of a post-repossession auction price of the target vehicle from the estimated wholesale auction price; and determining an estimated post-repossession auction price of the target vehicle based on the estimated wholesale auction price and the determined discount factor.

In yet another aspect, a computer system for determining auction prices of vehicles may include a memory storing instructions; and one or more processors configured to execute the instructions to perform operations. The operations may include: obtaining wholesale auction price data indicative of wholesale auction prices and vehicle attribute values of a plurality of vehicles; grouping the plurality of vehicles into a plurality of vehicle groups respectively associated with a plurality of characteristics, each of the plurality of vehicle groups being a set of vehicles having the respective characteristic; determining a plurality of regression models respectively based on the plurality of vehicle groups, each of the plurality of regression models being configured to output an estimated wholesale auction price as a function of a plurality of input variables, the plurality of input variables including one or more vehicle attributes and one or more economic indicators; receiving, from a user device over a communication network, a request to compute the post-repossession auction price of a target vehicle, the request identifying the target vehicle; obtaining information describing the target vehicle, the information being indicative of target-vehicle values for the one or more vehicle attributes; based on the target-vehicle values of the target vehicle and values for the one or more economic indicators, determining an estimated wholesale auction price of the target vehicle using an identified regression model of the plurality of regression models, that is associated with a characteristic possessed by the target vehicle; determining a discount factor representing an expected discount of a post-repossession auction price of the target vehicle from the estimated wholesale auction price; determining an estimated post-repossession auction price of the target vehicle based on the estimated wholesale auction price and the determined discount factor; and transmitting a response to the user device indicative of the estimated post-repossession auction price.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as wholesale auction price data, one or more vehicle attributes, one or more economic indicators, or discount factors may be used to generate auction prices of vehicles.

The methods and system disclosed herein may perform account-level forecasting of the auction price of any vehicle in any future months. A repossessed vehicle may have a poorer condition than an average vehicle in a vehicle auction (e.g., a wholesale auction market), and thus, the repossessed vehicle may receive a price reduction relative to a respective wholesale auction price. The methods and system disclosed herein are directed to precisely predicting the auction prices of a repossessed vehicle (e.g., an estimated post-repossession auction price) by separately forecasting both the wholesale value and the auction price of the vehicle if the vehicle is repossessed. The methods and system disclosed herein also may be sensitive to macroeconomics and auto market supply demand. Still further, the methods and system disclosed herein may forecast the auction price on a granular level. For example, the methods and system disclosed herein may forecast the auction price by differentiating a vehicle's price depreciation by one or more vehicle attributes (e.g., make, model, trim, and body style).

Figure 1:
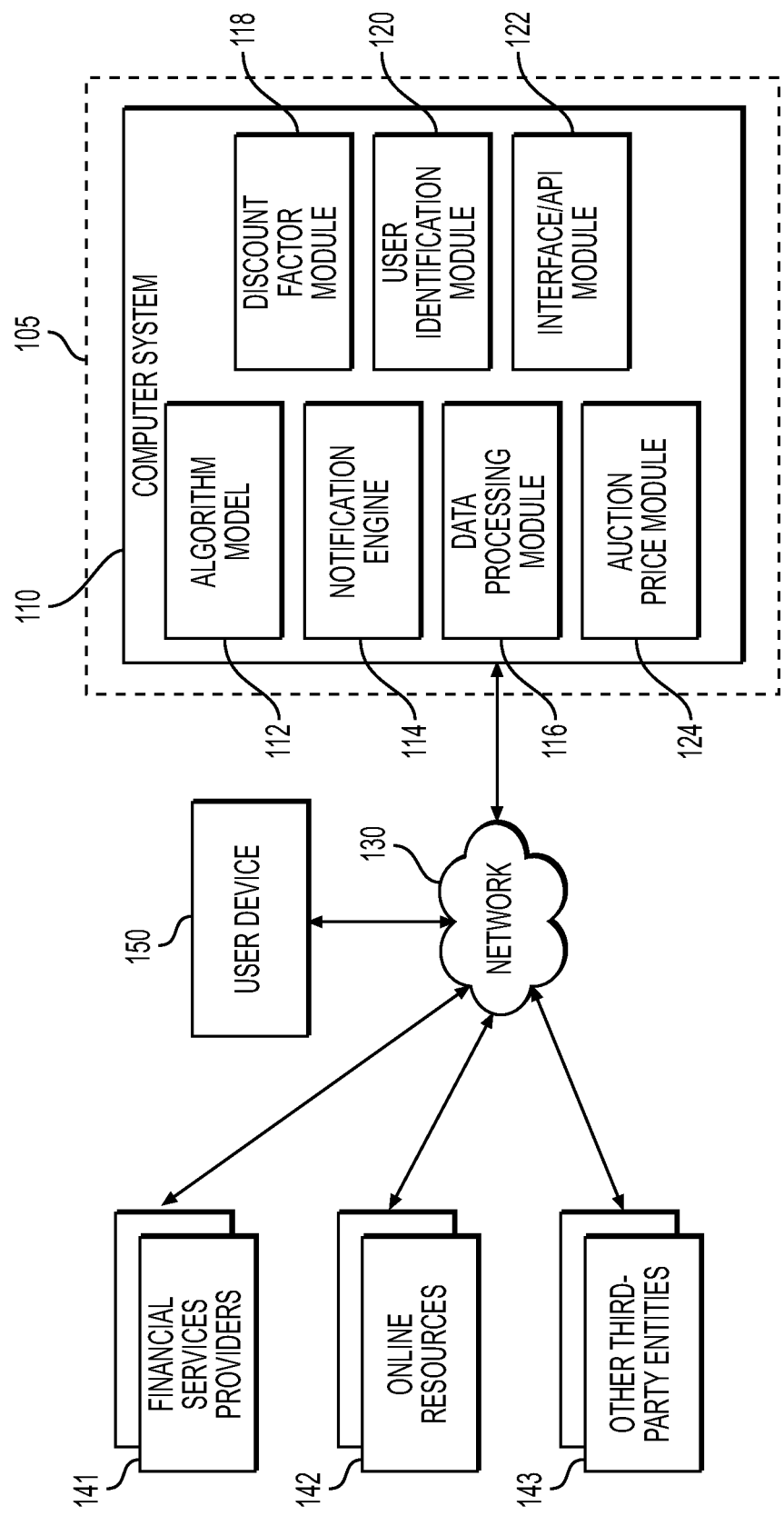
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources for collecting data (e.g., wholesale auction price data) 140, and one or more user devices 150. The one or more resources for collecting data 140 may include financial services providers 141, online resources 142, and other third-party entities 143. These components may be in communication with one another via the network 130.

The computer system 110 may have one or more processors configured to perform methods described in this disclosure. The computer system 110 may include one or more modules, models, or engines. The one or more modules, models, or engines may include an algorithm model 112, a notification engine 114, a data processing module 116, a discount factor module 118, a user identification module 120, an interface/API module 122, and/or an auction price module 124, which may each be software components stored in the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include one or more regression models (e.g., trained machine learning models). Details of algorithm model 112 are described elsewhere herein. The notification engine 114 may be configured to generate and communicate (e.g., transmit) one or more notifications (e.g., estimated post-repossession auction price) to user device 150 through the network 130. The data processing module 116 may be configured to monitor, track, clean, process, or standardize data (e.g., wholesale auction price data, one or more vehicle attributes, one or more economic indicators) received by the computer system 110. One or more algorithms may be used to clean, process, or standardize the data. The data processing module may provide processed data to other engines, modules, or models. The discount factor module 118 may be configured to determine, manage, monitor or track discount factor or any information regarding a discount factor associated with a vehicle (e.g., a repossessed vehicle). The discount factor module 118 may retrieve, store, and otherwise aggregate or manage one or more discount factors or any information regarding discount factors associated with a vehicle (e.g., a repossessed vehicle) determined via one or more algorithms or obtained from one or more resources 140. The user identification module 120 may manage identification data for each user accessing the computer system 110, possibly including, but not limited to, user names, passwords, contact information, social security numbers, or any additional information pertaining to each user accessing the computer system 110. In one implementation, the identification data associated with each user may be stored to, and retrieved from, the one or more resources 140 or one or more components of a data storage associated with the computer system 110. The interface/API module 122 may allow the user to interact with one or more modules, models, or engines of the computer system 110. The auction price module 124 may perform any process associated with determining the auction prices (e.g., determining an estimated post-repossession auction price).

Computer system 110 may be configured to receive data from other components (e.g., financial services providers 141, online resources 142, other third-party entities 143, and/or user device 150) of the system environment 100 through network 130. Computer system 110 may further be configured to utilize the received data by inputting the received data into the algorithm model 112 to produce a result. Information indicating the result (e.g., an estimated post-repossession auction price) may be transmitted to user device 150 over the network 130. In some examples, the computer system 110 may be referred to as a server system that provides a service including providing the information indicating the result to user device 150.

Network 130 may be any suitable network or combination of networks and may support any appropriate protocol suitable for communication of data to and from the computer system 110. Network 130 may include a public network (e.g., the Internet), a private network (e.g., a network within an organization), or a combination of public and/or private networks. The network 130 may include one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that enables communication between one or more components of the network layout. In some embodiments, the network 130 may be implemented using cell and/or pager networks, satellite, licensed radio, or a combination of licensed and unlicensed radio.

Financial services providers 141 may be an entity such as a bank, credit card issuer, merchant services provider, or other type of financial service entity. In some embodiments, financial services providers 141 may include one or more credit monitoring agencies or one or more loan prequalifying agencies. In some examples, financial services providers 141 may include one or more merchant services providers that provide merchants with the ability to accept electronic payments, such as payments using credit cards and debit cards. Therefore, financial services providers 141 may collect and store credit information, transaction/purchasing information, and/or user instructions. The financial services providers 141 may handle transactions associated with purchasing and selling a vehicle (e.g., providing loans to a customer to purchase a vehicle), thus, the financial service providers 141 may collect data or information related to a vehicle. The financial services providers 141 may include one or more databases to store data. In some embodiment, financial services providers 141 may provide a platform (e.g., an app on a user device) with which a user can interact. Such user interactions may provide data (e.g., information describing a target vehicle) that may be analyzed or used in the method disclosed herein.

Online resources 142 may include webpages, e-mail, apps, or social networking sites. Online resources 142 may be provided by financial service providers (e.g., financial service providers 141), manufacturers, retailers (e.g., merchants), and other entities. Online resources 142 may include other computer systems, such as web servers, that are accessible by computer system 110. The online resources 142 (e.g., Black Book) may be configured to provide any information regarding a vehicle (e.g., wholesale auction price data).

Other third-party entities 143 may be any entity that is not a financial services provider 141 or online resources 142. For example, other third-party entities 143 may include a merchant. Other third-party entities 143 may include merchants that may each be an entity that provides products. The term "product," in the context of products offered by a merchant, may encompass both goods and services, as well as products that are a combination of goods and services. A merchant may be, for example, a retailer, a vehicle dealer, a grocery store, an entertainment venue, a service provider, a restaurant, a bar, a non-profit organization, or other type of entity that provides products that a consumer may consume. A merchant may have one or more venues that a consumer may physically visit in order to obtain the products (goods or services) offered by the merchant. The other third-party entities 143 may handle transactions associated with purchasing and selling a vehicle, thus, the other third-party entities 143 may collect data or information related to a vehicle. In some embodiments, other third-party entities 143 may provide a platform (e.g., an app on a user/customer device) with which a user can interact. Such user interactions may provide data (e.g., information describing a target vehicle) that may be analyzed or used in the method disclosed herein.

The financial services providers 141, the online resources 142, or any other type of third-party entities 143 may each include one or more computer systems configured to gather, process, transmit, and/or receive data. In general, whenever any of financial services providers 141, the online resources 142, or any other type of third-party entities 143 is described as performing an operation of gathering, processing, transmitting, or receiving data, it is understood that such operations may be performed by a computer system thereof. In general, a computer system may include one or more computing devices, as described in connection with FIG. 4 below.

User device 150 (or a device associated with a user) may operate a client program, also referred to as a user application, used to communicate with the computer system 110. This user application may be used to provide information to the computer system 110 and to receive information from the computer system 110. User device 150 may be associated with interface/API module 122 of computer system 110. In some examples, the user application may be a mobile application that is run on the user device 150. User device 150 may be an electronic mobile device (e.g., smartphone, tablet, pager, personal digital assistant (PDA)), a computer (e.g., laptop computer, desktop computer, server), or a wearable device (e.g., smartwatches). User device 150 can also include any other device capable of providing or rendering data. User device 150 may optionally be portable. User device 150 may be handheld. User device 150 may be a network device capable of connecting to a network, such as the network 130, or other networks such as a local area network (LAN), wide area network (WAN) such as the Internet, a telecommunications network, a data network, or any other type of network. User device 150 may be utilized to obtain identification of the user and/or authenticate the user.

Computer system 110 may be part of entity 105, which may be any type of company, organization, or institution. In some examples, the entity 105 may be a financial services provider (e.g., financial services provider 141). In such examples, the computer system 110 may have access to data pertaining to vehicle transactions through a private network within the entity 105. For example, if the entity 105 is a card issuer, entity 105 may collect and store vehicle transactions involving a credit card or debit card issued by the entity 105. In such examples, the computer system 110 may still receive information regarding vehicle transactions from other financial services providers 141.

Figure 2:
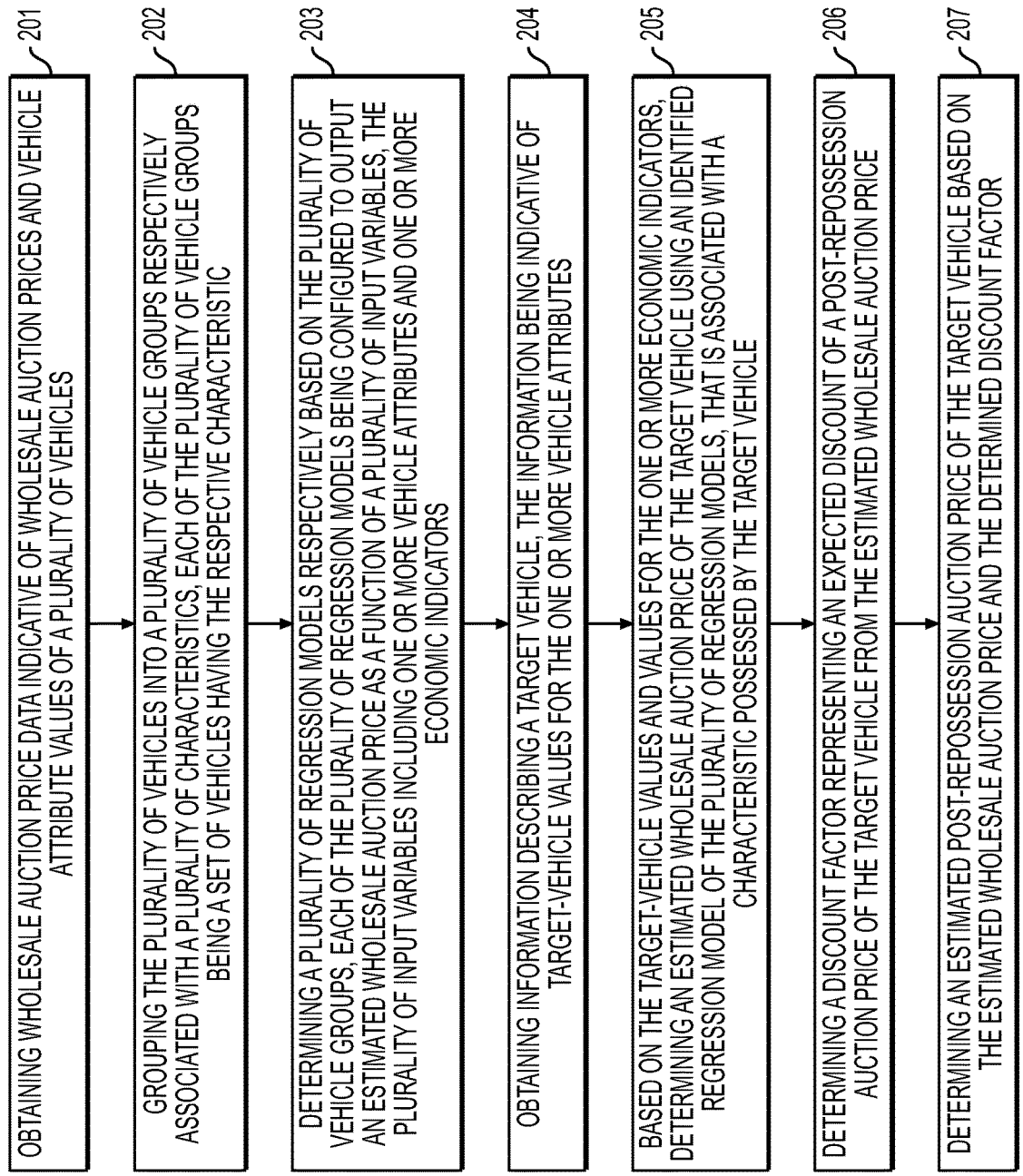
FIG. 2 depicts a flowchart of an exemplary method of determining auction prices of vehicles, according to one or more embodiments.

FIG. 2 is a flowchart illustrating a method for determining auction prices of vehicles, according to one or more embodiments of the present disclosure. The method may be performed by computer system 110.

Step 201 may include obtaining wholesale auction price data indicative of wholesale auction prices and vehicle attribute values of a plurality of vehicles. The wholesale auction prices may be historical or expected sale prices of vehicles purchased by vehicle dealers or any other purchaser during a vehicle auction. The vehicle auction may be a market or an event to buy or sell vehicles that is organized by one or more resources 140 (e.g., insurance companies or vehicle auction houses). The wholesale auction price data may be used to calculate auction prices of repossessed vehicles. The repossessed vehicles may be used vehicles that go through a repossession, which may be processes where an auto lender can take back possession of vehicles due to the fault of the vehicle owners or operators (e.g., failure to pay an auto loan). The wholesale auction price may be obtained from one or more resources 140, user device 150, computer system 110, or entities 105. Such wholesale auction price data may be stored in one or more databases associated with the one or more resources 140, user device 150, computer system 110, or entities 105. In some embodiments, the wholesale auction price data may be obtained from one or more resources 140, but not from the computer system 110 nor entities 105. The wholesale auction price data (e.g., either historical data or expected data) may be obtained from Black Book. The wholesale auction price data may be linked (e.g., correlated, associated, or otherwise related) to internal data from one or more resources (e.g., resources 140) via a vehicle identification number (VIN). Details of the internal data from the one or more resources and the VIN are described elsewhere herein. The wholesale auction price data may include wholesale vehicle values associated with a unique vehicle combination (UVC) of one or more vehicle attributes. Such wholesale auction price data may be provided repeatedly during a predetermined period of time (e.g., a monthly, weekly, and/or daily basis) starting at the time when the vehicle first appears in the market or in one or more databases, automatically, upon satisfaction of any required wholesale auction price data threshold, or upon request (e.g., a user or an entity may force a refresh of the wholesale auction price data in order to have the most up-to-date wholesale auction price data). The wholesale auction price data may include an expected value of a vehicle for sale at vehicle auctions on a nationwide level with average condition and average mileage for that vehicle. The expected value of a vehicle may be determined based on a combination of recent sale prices of the vehicle at vehicle auctions and inputs (e.g., an estimated fluctuation of the price) provided by one or more customers (e.g., a customer who attends the vehicle auction).

The vehicle attribute values may be description or numerical values of one or more vehicle attributes. The one or more vehicle attributes may include vehicle year (e.g., the vehicle is made in 2015), body style (e.g., a SUV), and/or trim (e.g., the hybrid vehicle). The one or more vehicle attributes may include one or more vehicle features. The one or more vehicle features may include one or more exterior features or one or more interior features of the vehicle. The one or more vehicle features may include certain vehicle features (e.g., the trim) but not include other vehicle features (e.g., add-on features). The one or more exterior features of the vehicle may include at least one of a wheel feature, a color feature, or a shape feature of the vehicle. The wheel feature of the vehicle may include, for example, the size (e.g., the diameter and width), the brand, the type, the safety level, the rim, the hubcap, or the material of the wheel. The color feature may include any information regarding colors or finishes of the exterior of the vehicle. The colors of the vehicle may include, by way of example, red, white, blue, black, silver, gold, yellow, orange, pink, green, or gray. The finishes of the exterior of the vehicle may include, for example, matte finish, pearlescent finish, metallic finish, or gloss finish. The shape feature of the vehicle may include the shape of any portion of the exterior of the vehicle, including, the shape of the front side of the vehicle, the shape of the flank side of the vehicle, or the shape of the back side of the vehicle. The one or more exterior features of the vehicle may also include any information regarding the vehicle, including, but not limited to, vehicle class (e.g., convertible, coupe, sedan, hatchback, sport-utility vehicle, cross-over, minivan, van, or wagon), rear luggage compartment volume, door features (e.g., falcon wing doors, or automatic doors), light features (e.g., color, shape, and/or location of the tail light), towing capacity (e.g., 4000 lbs. towing limit), mirror features (e.g., shape or location of the rear mirror, heated side mirrors), sensor and monitor features (e.g., including proximity sensors, humidity sensors, or temperatures sensors), or roof features (e.g., sun roof, moon roof, panoramic roof).

The one or more interior features of the vehicle may include at least one of a material feature, an electronics feature, an engine feature, or an add-on feature of the vehicle. The material feature may include any information regarding the material of the interior of the vehicle, including, for example, the material of the seats (e.g., leather, cloth, suede, etc.). The electronics feature may include any information regarding electronics in the vehicle, including, for example, audio and multi-media (e.g., in-vehicle internet streaming music and media), internet browser, navigation system, on-board safety or convenience features (e.g., emergency breaking, self-driving, lane assist, self-parking). The engine feature may include any information regarding the engine of the vehicle, including, but not limited to, types of engines (e.g., internal combustion engines, external combustion engines, hybrid engines, or electronic-powered engines), engine layout (e.g., front engine layout), maximum engine speed, max engine power, design and cylinders, valves, drivetrain type (e.g., 4-wheel drive, all-wheel drive, front-wheel drive, or rear-wheel drive), transmission type (e.g., automatic or manual), fuel type (e.g., diesel, electric, gasoline, hybrid, or flex-fuel), or max torque. The add-on feature may include any additional interior features of the vehicle, including, seat features (e.g., heated seat, cooled seat), steering wheel features (e.g., heated steering wheel, cooled steering wheel), interior door features (e.g., metal handle), or sun visor feature (e.g., with vanity mirrors). The one or more vehicle features may also include any features of the vehicle, including, but are not limited to, the performance of the vehicle (e.g., track speed, 0-60 mph), the history of the vehicle (e.g., years of manufacturing, mileage), service features (e.g., 4 years of warranty), or break features.

Step 202 may include grouping the plurality of vehicles into a plurality of vehicle groups respectively associated with a plurality of characteristics, each of the plurality of vehicle groups being a set of vehicles having the respective characteristic. The plurality of characteristics may include a plurality of different combinations of one or more vehicle attributes. The plurality of characteristics may include a plurality of different combinations of vehicle make and vehicle model. The plurality of characteristics may further include a vehicle class. The vehicle class may indicate a type of a vehicle, including, but are not limited to, midsize car, compact car, or midsize SUV. Each vehicle class may include different combinations of vehicle make and vehicle model. The grouping the plurality of vehicles may include grouping the plurality of vehicles based on the plurality of characteristics. In one example, the grouping the plurality of vehicles may include grouping the plurality of vehicles based on the plurality of characteristics including vehicle year (e.g., 2017, 2018), trim (e.g., Hybrid, SE), body style (e.g., sedan), age group (e.g., relatively new if the vehicle has only 27 months in the vehicle auction market), or month or seasonality (e.g., January). In another example, one vehicle group may include all the vehicles that are compact cars. In yet another example, one vehicle group may include all the vehicles that are Honda coupe-type vehicles. One or more algorithms (e.g., a decision tree model or classification model) may be used to group the plurality of vehicles into a plurality of vehicle groups respectively associated with a plurality of characteristics. In some arrangements, the one or more vehicles may be grouped manually (e.g., either by make/model or by a human-determined vehicle feature). Additionally, one or more algorithms may then be used to determine how to map a specific vehicle to one vehicle feature of the one or more vehicle features. In one example, the grouping step may shrink over 25,000 unique combinations of distinct vehicles to about 450 combinations, which may enable efficient and precise computation.

Step 203 may include determining a plurality of regression models respectively based on the plurality of vehicle groups, each of the plurality of regression models being configured to output an estimated wholesale auction price as a function of a plurality of input variables. The plurality of input variables may include one or more vehicle attributes and one or more economic indicators. The one or more economic indicators may include a broad economic indicator, an industry economic indicator, gas price indicators, or any macroeconomic information that can be obtained from one or more resources (e.g., Black Book). The broad economic indicators may include unemployment (e.g., unemployment data with both an absolute value and a year-over-year ratio), home prices (e.g., housing prices with a year-over-year ratio), the gross domestic product (GDP, e.g., a year-over-year growth ratio), vehicle rebates, or interest rates (e.g., interest rate over multiple time periods with both absolute value and year-over-year changes). Industry economic indicators may include new vehicle sale prices (e.g., manufacturer's suggested retail price), an inventory to sales ratio, and/or the seasonally-adjusted annualized rate of new auto sales (SAAR). Inventory to sales ratios may be used as an indicator of demand and may be used both at an absolute level as well as a year-over-year ratio. SAAR may be used to estimate overall supply of autos and its lagged values (e.g., values at previous time slots or historical values, instead of the current values) may be used as proxies for current used vehicle supply. SAAR may be divided into auto type (e.g., car vs truck), lagged values, and year-over-year ratios. In one example, a regression model may analyze the SAAR ratio of cars to trucks to estimate the relative demand of those types of vehicles. A lagged SAAR ratio compared to a current SAAR ratio may indicate whether historical supply is well balanced with consumer demand. Gas prices indicators may be estimated by the Consumer Price Index (CPI urban consumer gasoline index and its year-over-year ratio). One or more economic indicators may further include Case-Shiller Home Price Index or employment number, based on which transformed variables such as home price appreciation (HPA), unemployment rate growth, or employment growth can be obtained.

The plurality of regression models may include a regression-based random effect model (e.g., a Bayesian hierarchical model) that applies separately for different vehicle groups respectively associated with a plurality of characteristics or one or more vehicle attributes (e.g., vehicle make/model combination or vehicle class). Vehicles that are first differentiated or grouped based on one or more vehicle attributes (e.g., vehicle make/model) may then be differentiated based on other vehicle attributes (e.g., vehicle class) if the first differentiation or grouping insufficiently trains the regression model. For example, during one grouping, vehicles may be differentiated/grouped based on the make and/or model. Further, during another grouping, the vehicles may be differentiated based on vehicle class if some of the vehicles do not have enough information regarding the make or model. In this situation, a first regression model (e.g., a first random effect model) for each make/model may be determined first, and then a second regression model (e.g., a second random effect model) for each vehicle class may be determined. In another example, vehicles may be first differentiated/grouped based on the make, model, vehicle year, trim, or body style dimensions; and then be differentiated or grouped based on the vehicles' characteristics such as price depreciation pattern over time if some of the vehicles do not have enough information regarding the make, model, vehicle year, trim, and body style dimensions (e.g., these vehicles are too new and/or uncommon).

The random effect model(s) may treat one or more vehicle attributes as a random effect (e.g., for different input data of this random effect model, the values for one or more vehicle attributes may be different) or treat one or more economic indicators as fixed effects (e.g., for every input of this random effect model, the values for one or more economic indicators are the same). The random effect model may capture the features/trend that the wholesale auction price of a vehicle decreases over time as the vehicle ages. Such deprecation may exhibit an exponential decay pattern (e.g., a logarithm of the wholesale auction price decreasing with time at a linear rate) plus any price fluctuation due to an exponential pattern of price depreciation, or fluctuation due to seasonality and economic impacts (e.g., one or more economic indicator).

The determining the plurality of regression models may include training each of the plurality of regression models using a machine learning algorithm/model and using the respective vehicle group of the plurality of vehicle groups as a training set. For instance, the machine learning algorithm may be trained with at least the wholesale auction price data obtained from Black Book, which may contain monthly wholesale auction values from January 2004 to April 2018, for all vehicles of vehicle years 2002 and after. In this situation, the training set may include in total over 25,000 unique vehicles, each belonging to one of the 680 distinct make/models. After determining a plurality of regression models respectively based on the plurality of vehicle groups, each of the plurality of regression models may be used to generate or output at least one new estimated wholesale auction price based on new input of values of one or more vehicle attributes and one or more economic indicators. Details of the machine learning algorithm/model are described elsewhere herein.

Step 204 may include obtaining information describing a target vehicle. The information describing a target vehicle may be obtained through one or more inputs of the user via a user device (e.g., user device 150). The one or more inputs may include any information provided by the user via the user device, including, but not limited to, one or more images of the target vehicle, or name of the target vehicle. The user device 150 may be capable of accepting inputs of a user via one or more interactive components of the user device 150, such as a keyboard, button, mouse, touchscreen, touchpad, joystick, trackball, camera, microphone, imaging device, or motion sensor.

The information obtained in step 204 may be indicative of target-vehicle values for the one or more vehicle attributes. The values for the one or more vehicle attributes may be a description or a numeral value of the one or more vehicle attributes. For instance, if the one or more vehicle attributes include the model and make of the vehicle, and the target vehicle is Tesla Model X, then the information describing the target vehicle may include a make of Tesla and a model of Model X. Details of the one or more vehicle attributes are described elsewhere herein.

In determining auction prices of vehicles, data (e.g., wholesale auction price data, one or more vehicle attributes, and/or one or more economic indicators) may be processed, overwritten, or transformed. In one example, raw data associated with one or more economic indicators (e.g., gas price, house price, unemployment, inventory to sales, or sales) may be transformed or converted to year-over-year ratios. The year-over-year ratios may be positive, and can be either above or below 1. In another example, raw data of sales may be converted to 1, 2, and/or 3 year-lagged variables. For example, the 1-year-lagged truck new sales in January 2018 may be the raw input one year earlier, e.g., in January 2017; and the 2-year-lagged truck new sales in January 2018 may be the raw input two years earlier, e.g., in January 2016. In another example, continuous parameters (e.g., one or more economic indicators that are continuously changing over time) may be centered and rescaled, and/or in regression, a logarithm transformation on the continuous parameters may be applied. In yet another example, the raw data of one or more economic indicators may have abnormally high values for inventory to sales, car sales, or truck sales during a specific month of the year. To smooth or normalize these extreme values, such raw data of the one or more economic indicators may be overwritten with an average value of the month before and the month after the specific month of the year.

Step 205 may include, based on the target-vehicle values and values for the one or more economic indicators, determining an estimated wholesale auction price of the target vehicle using an identified regression model of the plurality of regression models, that is associated with a characteristic possessed by the target vehicle. The identified regression model of the plurality of regression models may be identified based on one or more characteristics possessed by the target vehicle. For instance, if the target vehicle is a Toyota Camry, so the one or more characteristics possessed by the target vehicle is a make of Toyota and a model of Camry, and then the identified regression model may be a regression model associated with a make of Toyota and a model of Camry. The identified regression model may take the target-vehicle values (e.g., a make of Toyota and a model of Camry) and values for one or more economic indicators (e.g., unemployment rate) as input data, and determine the estimated wholesale auction price of the target vehicle as an output data. For example, if the target vehicle is a Toyota Camry and the identified regression model is a regression model associated with a make of Toyota and a model of Camry, then the identified regression model may take the input data including a make of Toyota, a model of Camry, and/or any associated values of vehicle attributes and economic indicators to generate an estimated wholesale auction price of the target vehicle.

The determining the estimated wholesale auction price may be based further on a time series model. The time series model may include an autoregressive process that may take into account time dependency of one or more vehicle attributes or economic indicators. The autoregressive process may indicate that the output variable depends linearly on its own previous values and on a stochastic term (an imperfectly predictable term). For each vehicle, an autoregressive process (e.g., an autoregressive model) may be fit on the time series of regression residuals. The time series model may assume that, even after taking all regression predictors (e.g., one or more vehicle attributes and/or one or more economic indicators) into account, a vehicle's wholesale auction price in a certain month may depend on its values in the previous period of time (e.g., previous two months). Such dependency may reflect how people (e.g., customers, users, economists, market analysts, etc.) rationally perceive auction prices in reality. The time series model may improve accuracy of the estimated wholesale auction price, especially for short-term estimation. The time series of regression residuals (e.g., an error in a regression model) may exhibit significant autocorrelation along time. In one example, the autocorrelation functions of regression residuals for an example Honda Civic vehicle can show higher than 80% improved estimation and forecast accuracy of wholesale auction prices.

Step 206 may include determining a discount factor representing an expected discount of a post-repossession auction price of the target vehicle from the estimated wholesale auction price. Such a discount factor may indicate or can be used to calculate a value that equals the estimated wholesale auction price minus the post-repossession auction price. The discount factor may be a ratio between the post-repossession auction price net of fees and the wholesale auction price. The discount factor may be a ratio between the value of the estimated wholesale auction price minus post-repossession auction price and the wholesale auction price. The discount factor may be a ratio between the post-repossession auction price and the wholesale auction price. The discount factor may be computed based on one or more vehicle attributes (e.g., vehicle class), one or more economic factors (e.g., seasonality (month of the year), unemployment rate), or internal data obtained from one or more resources (e.g., financial services provider 141). The discount factor may be multiplied by the actual or estimated wholesale auction price to obtain the estimated post-repossession auction price.

The internal data obtained from the one or more resources may be used to provide weighting and context for the outputs of wholesale value (e.g., wholesale auction price). Such internal data may include Vehicle Identification Numbers (VINs) and other identifying information to obtain data from internal Auto Data Warehouse (e.g., data from the computer system 110 or entity 105). Each VIN may be a unique code, including a serial number, used by the automotive industry to identify individual motor vehicles, towed vehicles, motorcycles, scooters, and mopeds. The VIN may be associated with any information about a vehicle stored in one or more databases. By using the VIN, additional information of an individual vehicle may be obtained, such as the vehicle's make, model, model year, body style, engine type, manufacture location, and trim. The VIN may provide a link between identification of a vehicle from a financial services provider 141 and wholesale auction price data (e.g., wholesale vehicle values associated with a UVC). This link may be used to project at a vehicle level, as well as use portfolio to proxy the industry mix of UVCs within a given make/model combination. This link may be used to project at a vehicle level, as well as to leverage an auto lending portfolio to proxy the industry mix of UVCs within a given model. The VIN may be used to connect different datasets stored in one or more databases within an individual resource of the one or more resources 140 or an entity 105. For instance, Black Book may link internal VINs to UVCs by providing data at a VIN-prefix level (e.g., the VIN prefix is the first 11 digits of the VIN, which provide all of the identifying information in the VIN) to show which UVCs can map back to a single VIN prefix.

The internal data obtained from the one or more resources 140 may be used to correlate the wholesale auction price and the actual post-repossession auction price. The internal data obtained from one or more resources 140 may include data related to one or more vehicle attributes (e.g., a vehicle class) or auction recoveries data. The auction recoveries data may validate performance of the regression model. The auction recoveries data may also include account-level data—such as a Fair, Isaac and Company (FICO) data—which can be predictive of the condition of the recovered vehicle and an expected degree of recovery relative to average wholesale value when the vehicle goes to auction.

The determining the discount factor may include selecting the discount factor from a set of discount factors, each discount factor in the set of discount factors being associated with at least with a respective vehicle classification, based on a match (e.g., a complete match or a match equal to or exceeding a predetermined threshold of similarity) between the respective vehicle classification associated with the selected discount factor and a vehicle classification of the target vehicle. For example, if the respective vehicle classification is a Honda civic coupe and is associated with a selected discount factor of 0.8, and a target vehicle is a Honda civic coupe made in year 2010, then the target vehicle may be associated with the same selected discount factor of 0.8.

Each discount factor in the set of discount factors may be further associated with a respective credit rating (e.g., a credit score) of the user or the owner/operator of the target vehicle. The credit rating may be a constant obtained when an auto loan is originated. The credit rating may be obtained periodically (e.g., every day or every week). The credit rating may be an average credit score over a period of time (e.g., one year or one quarter). The credit rating may be categorized into different credit rating ranges, and each credit rating range may be associated with a specific discount factor. For instance, the credit rating ranges may include a credit rating between 0 and 500, a credit rating between 501 and 620, a credit rating between 621 and 700, or a credit rating above 700. The selecting the discount factor may be based further on a match (e.g., a complete match or a match equal to or exceeding a predetermined threshold of similarity) between a credit rating of an owner/operator of the target vehicle and the respective credit rating associated with the selected discount factor. For example, if the respective credit rating is above 700 and is associated with a selected discount factor of 0.8, and a credit rating of an owner/operator of the target vehicle is 705, then the target vehicle may be associated with the same selected discount factor of 0.8.

Each discount factor in the set of discount factors may be further associated with a seasonality classification (e.g., spring, winter, fall, summer, January, February, March, etc.). The discount factors associated with a seasonality classification may indicate any depreciation of the vehicle due to season change (e.g., a change of months). The selecting the discount factor may be based further on a match (e.g., a complete match or a match equal to or exceeding a predetermined threshold of similarity) between a seasonality classification of a specified auction time and the respective seasonality classification associated with the selected discount factor. The specified auction time may be a time at which the estimated post-repossession auction price is applicable. For example, if the respective seasonality classification is winter and is associated with a selected discount factor of 0.9, and a specified auction time of the target vehicle is December, then the target vehicle may be associated with the same selected discount factor of 0.9.

Step 207 may include determining an estimated post-repossession auction price of the target vehicle based on the estimated wholesale auction price and the determined discount factor. The estimated post-repossession auction price may be equal to the estimated wholesale auction price multiplied by the discount factor. The estimated post-repossession auction price may be demonstrated on a display of a device associated with the user. For example, the estimated post-repossession auction price may be configured to be displayed on a display screen of a user device, e.g., user device 150. The estimated post-repossession auction price may be displayed on the display screen in any suitable form, such as an e-mail, a text message, a push notification, content on a web page, and/or any form of graphical user interface.

At any stage of determining the auction prices of vehicles, the method may further include retrieving, from a computer system, economic data indicative of economic or automobile market trends. Such economic data may be stored in one or more databases associated with one or more resources 140. The method may further include determining the values of the one or more economic indicators based on the economic data. One or more algorithms may be used to extract or obtain values of the one or more economic indicators from the economic data. The economic data may predict market trends for wholesale auction prices. Such trends may include any information regarding how the automobile industry may move, including, but not limited to, a strong increase of new vehicle sales volume among light trucks, a decrease of new vehicle sales volume among sports vehicles, or emergence of electric vehicles.

At any stage of determining auction prices of vehicles, the method may further include storing the auction prices of vehicles (e.g., the estimated post-possession auction price) for subsequent analysis. The stored auction prices of vehicles may have an expiration period. The expiration period may be at least 1 day, 1 week, 1 month, 1 quarter, 1 year or longer. In other embodiments, the expiration period may be at most 1 year, 1 quarter, 1 month, 1 week, 1 day or shorter. The subsequent analysis may include analyzing the auction prices of vehicles to update the wholesale auction price data, the one or more vehicle attributes, discount factors, or the one or more economic factors. The auction prices of vehicles may also be one of the one or more variables used in training a trained machine learning model. Details of the trained machine learning model are described elsewhere herein.

Figure 3:
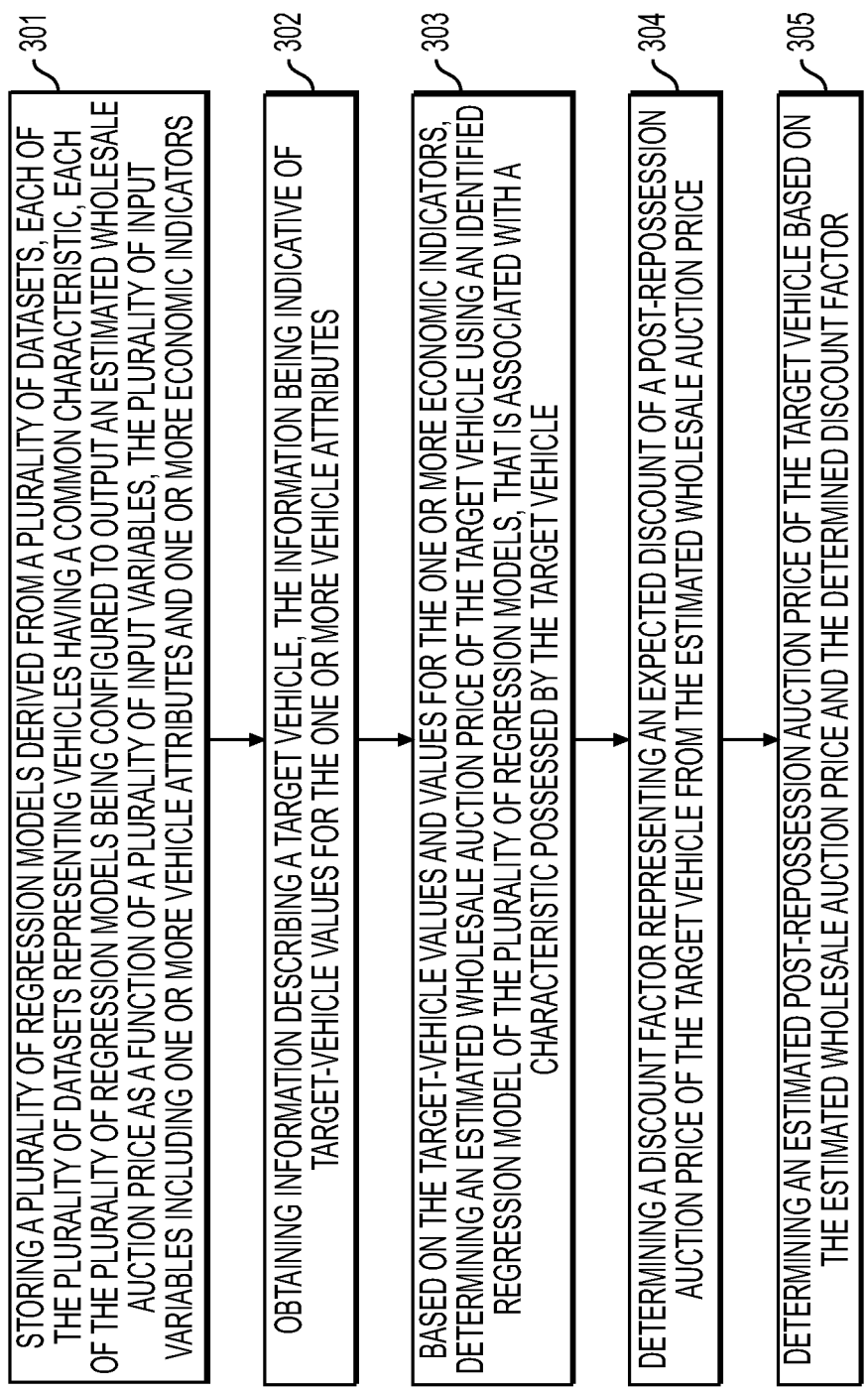
FIG. 3 depicts a flowchart of another exemplary method of determining auction prices of vehicles, according to one or more embodiments.

FIG. 3 is a flowchart illustrating another exemplary method for determining auction prices of vehicles, according to one or more embodiments of the present disclosure. The method may be performed by computer system 110.

Step 301 may include storing a plurality of regression models derived from a plurality of datasets. Such a plurality of regression models may be stored in one or more databases associated with one or more resources 140, computer system 110, or entity 105. Each of the plurality of datasets may represent vehicles having a common characteristic. Such a common characteristic may be a same value or a same range of value for one of one or more vehicle attributes. The one or more vehicle attributes may include, by way of example only, vehicle year, body style, and/or trim. Each of the plurality of regression models may be configured to output an estimated wholesale auction price as a function of a plurality of input variables. The plurality of input variables may include one or more vehicle attributes and one or more economic indicators. Details of the plurality of regression models, the plurality of input variables, the estimated wholesale auction price, the one or more vehicle attributes, and the one or more economic indicators are described elsewhere herein.

Step 302, similarly to step 204, may include obtaining information describing a target vehicle. The information describing a target vehicle may be obtained through one or more inputs of the user via a user device (e.g., user device 150). The one or more inputs may include any information provided by the user via the user device 150, including, but not limited to, one or more images of the target vehicle, or name of the target vehicle. The user device 150 may be capable of accepting inputs of a user via one or more interactive components of the user device 150, such as a keyboard, button, mouse, touchscreen, touchpad, joystick, trackball, camera, microphone, imaging device, or motion sensor. The information obtained in step 302 may be indicative of target-vehicle values for the one or more vehicle attributes. The values for the one or more vehicle attributes may be a description or a numerical value of the one or more vehicle attributes. For instance, if the one or more vehicle attributes include the model and make of the vehicle and the target vehicle is a Toyota Corolla, then the information describing the target vehicle may include a make of Toyota and a model of Corolla. Details of the one or more images or one or more vehicle attributes are described elsewhere herein.

Step 303, similarly to step 205, may include, based on the target-vehicle values and values for the one or more economic indicators, determining an estimated wholesale auction price of the target vehicle using an identified regression model of the plurality of regression models, that is associated with a characteristic possessed by the target vehicle. The identified regression model of the plurality of regression models may be identified based on one or more characteristics possessed by the target vehicle. For instance, if the target vehicle is a Toyota Camry, so the one or more characteristics possessed by the target vehicle is a make of Toyota and a model of Camry, and then the identified regression model may be a regression model associated with a make of Toyota and a make of Camry. The identified regression model may take the target-vehicle values (e.g., a make of Toyota and a model of Camry) and values for the one or more economic indicators (e.g., unemployment rate) as input data, and determine the estimated wholesale auction price of the target vehicle as an output data. For example, if the target vehicle is a Toyota Camry and the identified regression model is a regression model associated with a make of Toyota and a model of Camry, then the identified regression model may take the input data including a make of Toyota, a model of Camry, and/or any associated values of vehicle attributes and economic indicators to generate an estimated wholesale auction price of the target vehicle. The plurality of input variables may include auction time, and the determining the estimated wholesale auction price may be based further on a specified auction time, the specified auction time being a time at which the estimated post-repossession auction price is applicable. In this situation, the estimated wholesale auction price may be calculated as a function of the auction time.

At any stage of determining the auction prices of vehicles, the method may further include retrieving, from a computer system, economic data indicative of economic or automobile market trends. Such economic data may be stored in one or more databases associated with one or more resources 140. The method may further include determining the values of the one or more economic indicators based on the economic data. One or more algorithms may be used to extract or obtain values of the one or more economic indicators from the economic data. The economic data may predict market trends for wholesale auction prices. Such trends may include any information regarding how the automobile industry may move, including, but not limited to, a strong increase of the new vehicle sales volume among light trucks, a decrease of new vehicle sales volume among sports vehicle, or emergence of electric vehicles.

Step 304, similarly to step 206, may include determining a discount factor representing an expected discount of a post-repossession auction price of the target vehicle from the estimated wholesale auction price. The determining the discount factor may include selecting the discount factor from a set of discount factors, each discount factor in the set of discount factors being associated with at least with a respective vehicle classification, based on a match between the respective vehicle classification associated with the selected discount factor and a vehicle classification of the target vehicle. Each discount factor in the set of discount factors may be further associated with a respective credit rating, and the selecting the discount factor may be based further on a match between a credit rating of an owner/operator of the target vehicle and the respective credit rating associated with the selected discount factor. Each discount factor in the set of discount factors may be further associated with a seasonality classification (e.g., spring, winter, fall, summer, January, February, March, etc.), and the selecting the discount factor may be based further on a match between a seasonality classification of a specified auction time and the respective seasonality classification associated with the selected discount factor, the specified auction time being a time at which the estimated post-repossession auction price is applicable. Details of the discount factor and the selecting the discount factor are described elsewhere herein.

Step 305, similarly to step 207, may include determining an estimated post-repossession auction price of the target vehicle based on the estimated wholesale auction price and the determined discount factor. The estimated post-repossession auction price may be equal to the estimated wholesale auction price multiplied by the discount factor. The estimated post-repossession auction price may be demonstrated on a display of a device associated with the user. For example, the estimated post-repossession auction price may be configured to be displayed on a display screen of a user device, e.g., user device 150. The estimated post-repossession auction price may be displayed on the display screen in any suitable form, such as an e-mail, a text message, a push notification, content on a web page, and/or any form of graphical user interface.

At any stage of determining the auction prices of vehicles, the method may further include receiving, from a user device 150 over a communication network 130, a request to compute the post-repossession auction price of the target vehicle. The user device 150 may be capable of accepting the request of a user via one or more interactive components of the user device 150, such as a keyboard, button, mouse, touchscreen, touchpad, joystick, trackball, camera, microphone, or motion sensor input (e.g., an input device 450 as described in connection with FIG. 4, below). The request may identify the target vehicle. For instance, the user may type information or take images regarding a target vehicle via a user interface of the user device, and such information or images may be the request identifying the target vehicle.

The method may further include, after the determining the estimated post-repossession auction price, transmitting a response to the user device indicative of the estimated post-repossession auction price. Such estimated post-repossession auction price may be displayed on the display screen in any suitable form, such as an e-mail, a text message, a push notification, content on a web page, and/or any form of graphical user interface. The user may interact with the estimated post-repossession auction price, and such interaction may include, but is not limited to, comparing the post-repossession auction price of the target vehicle with prices of the target vehicle obtained from other sources, checking financing options associated with purchasing the target vehicle, or discovering more information regarding the target vehicle.

The regression models may accept the data identified in any steps described above as input data. Regression models may predict a number (e.g., an estimated post-repossession auction price). One or more regression models may be a machine learning model. The machine learning model may be of any suitable form, and may include, for example, a neural network, linear regression, logistic regression, tree-based methods like random forest or gradient boosting machines (GBM), support vector machines (SVM), or naïve Bayes classifiers. A neural network may be software representing human neural system (e.g., cognitive system). A neural network may include a series of layers termed "neurons" or "nodes." A neural network may include an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The regression models may produce the estimated post-repossession auction price as a function of the wholesale auction price data, the one or more vehicle attributes, the one or more economic indicators, the one or more discounting factors, or the one or more variables indicated in the input data. The one or more variables may be derived from the wholesale auction price data, the one or more vehicle attributes, the one or more economic indicators, and/or the one or more discounting factors. This function may be learned by training the machine learning model with training sets. The machine learning model may be trained by supervised, unsupervised, or semi-supervised learning using training sets comprising data of types similar to the type of data used as the model input. For example, the training set used to train the model may include any combination of the following: the wholesale auction price data, the one or more vehicle attributes, the one or more economic indicators, the one or more discounting factors, or the estimated post-repossession auction price. Accordingly, the machine learning model may be trained to map input variables to a quantity or value of estimated post-repossession auction price. The estimated post-repossession auction price determined by the machine learning model may be used as an additional input variable.

At any stage of determining auction prices of vehicles, the method may include obtaining identification data of the user, and/or authenticating the user. The authenticating the user may include obtaining the identification data of the user and comparing such identification data with pre-stored identification data. During the authenticating process, one or more algorithms may be used to compare the identification data with pre-stored identification data and determine whether there is a match (e.g., a complete match or a match equal to or exceeding a predetermined threshold of similarity) between the identification data with pre-stored identification data. The user may be able to access to the app or the platform associated with performing the methods based on whether there is a match (e.g., a complete match or a match equal to or exceeding a predetermined threshold of similarity) between the identification data and the pre-stored identification data. The pre-stored identification may be generated when a device (e.g., a user device 150) is registered or connected with computer system 110 and/or one or more resources 140. Once the pre-stored identification has been generated, it may be stored with other user account information and/or authentication information.

The methods disclosed herein may enable entities or individuals to efficiently understand and forecast auction prices of vehicles, meet important governance criteria, such as Comprehensive Capital Adequacy Review (CCAR) and stress test (e.g., whether the method is sensitive to different economic scenarios), and make important business decisions, such as corporate planning, capital reserve, and valuation strategies. The method disclosed herein may be able to model and forecast the auction prices of vehicles with significant granularity without complexity by not using a plurality of regression models corresponding to each of the one or more vehicle attributes.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110 and/or user device 150, may include one or more computing devices. If the one or more processors of the computer system 110 and/or user device 150 are implemented as a plurality of processors, the plurality of processors may be included in a single computing device or distributed among a plurality of computing devices. If a computer system 110 and/or user device 150 includes a plurality of computing devices, the memory of the computer system 110 may include the respective memory of each computing device of the plurality of computing devices.

Figure 4:
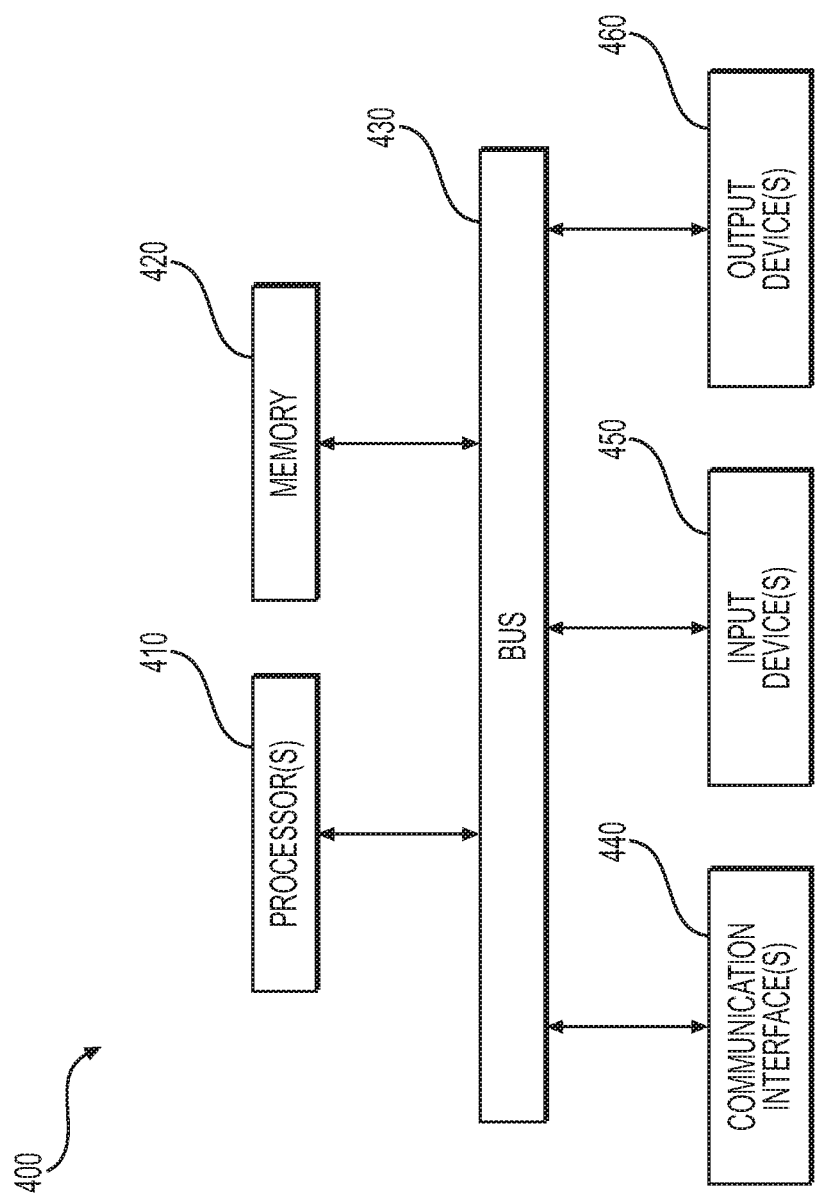
FIG. 4 depicts an example of a computing device, according to one or more embodiments.

FIG. 4 illustrates an example of a computing device 400 of a computer system, such as computer system 110 and/or user device 150. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for determining auction prices of vehicles, the method comprising:
    obtaining wholesale auction price data indicative of wholesale auction prices and vehicle attribute values of a plurality of vehicles;
    grouping the plurality of vehicles into a plurality of vehicle groups, each of the plurality of vehicle groups associated with a respective plurality of characteristics, and each of the plurality of vehicle groups being a set of vehicles having the respective plurality of characteristics;
    determining a plurality of regression models respectively based on the plurality of vehicle groups, each of the plurality of regression models being configured to output an estimated wholesale auction price as a function of a plurality of input variables, the plurality of input variables including one or more vehicle attributes and one or more economic indicators;
    training each of the plurality of regression models using a machine learning algorithm, and using the respective vehicle group of the plurality of vehicle groups as a training set;
    storing the plurality of regression models on a memory of a computer system;
    receiving, from a user device over a communication network, a request to compute a post-repossession auction price of a target vehicle, the request identifying the target vehicle;
    obtaining information describing the target vehicle, the information being indicative of target-vehicle values for the one or more vehicle attributes;
    identifying a regression model from amongst the plurality of regression models that is associated with a characteristic possessed by the target vehicle;
    accessing the identified regression model in the memory of the computer system and, based on the target-vehicle values and values for the one or more economic indicators, determining an estimated wholesale auction price of the target vehicle using the identified regression model;
    determining a discount factor representing an expected discount of a post-repossession auction price of the target vehicle from the estimated wholesale auction price;

determining an estimated post-repossession auction price of the target vehicle based on the estimated wholesale auction price and the determined discount factor; and transmitting a response to the user device indicative of the estimated post-repossession auction price.

2. The method of claim 1, wherein the plurality of characteristics includes a plurality of different combinations of vehicle make and vehicle model.

3. The method of claim 2, wherein the plurality of characteristics further includes a vehicle class.

4. The method of claim 1, wherein the one or more vehicle attributes includes vehicle year, body style, and/or trim.

5. The method of claim 1, further comprising:
retrieving, from a computer system, economic data indicative of economic or automobile market trends; and
determining the values of the one or more economic indicators based on the economic data.

6. The method of claim 1, wherein the determining the estimated wholesale auction price is based further on a time series model.

7. The method of claim 1, wherein the determining the discount factor includes:
selecting the discount factor from a set of discount factors, each discount factor in the set of discount factors being associated at least with a respective vehicle classification, based on a match between the respective vehicle classification associated with the selected discount factor and a vehicle classification of the target vehicle.

8. The method of claim 7, wherein
each discount factor in the set of discount factors is further associated with a respective credit rating, and
the selecting the discount factor is based further on a match between a credit rating of an owner of the target vehicle and the respective credit rating associated with the selected discount factor.

9. The method of claim 7, wherein
each discount factor in the set of discount factors is further associated with a seasonality classification, and
the selecting the discount factor is based further on a match between a seasonality classification of a specified auction time and the respective seasonality classification associated with the selected discount factor, the specified auction time being a time at which the estimated post-repossession auction price is applicable.

10. A computer system for determining auction prices of vehicles, the computer system comprising:
a memory storing instructions; and
one or more processors configured to execute the instructions to perform operations including:
obtaining wholesale auction price data indicative of wholesale auction prices and vehicle attribute values of a plurality of vehicles;
grouping the plurality of vehicles into a plurality of vehicle groups, each of the plurality of vehicle groups associated with a respective plurality of characteristics, and each of the plurality of vehicle groups being a set of vehicles having the respective plurality of characteristics;
determining a plurality of regression models respectively based on the plurality of vehicle groups, each of the plurality of regression models being configured to output an estimated wholesale auction price as a function of a plurality of input variables, the plurality of input variables including one or more vehicle attributes and one or more economic indicators;
training each of the plurality of regression models using a machine learning algorithm, and using the respective vehicle group of the plurality of vehicle groups as a training set;
storing the plurality of regression models in the memory;
receiving, from a user device over a communication network, a request to compute a post-repossession auction price of a target vehicle, the request identifying the target vehicle;
obtaining information describing the target vehicle, the information being indicative of target-vehicle values for the one or more vehicle attributes;
identifying a regression model from amongst the plurality of regression models that is associated with a characteristic possessed by the target vehicle;
accessing the identified regression model in the memory of the computer system and, based on the target-vehicle values and values for the one or more economic indicators, determining an estimated wholesale auction price of the target vehicle using the identified regression model;
determining a discount factor representing an expected discount of a post-repossession auction price of the target vehicle from the estimated wholesale auction price;
determining an estimated post-repossession auction price of the target vehicle based on the estimated wholesale auction price and the determined discount factor; and
transmitting a response to the user device indicative of the estimated post-repossession auction price.

11. The computer system of claim 10, wherein the one or more vehicle attributes includes vehicle year, body style, and/or trim.

12. The computer system of claim 10, wherein the operations further include:
retrieving, from a second computer system, economic data indicative of economic or automobile market trends; and
determining the values of the one or more economic indicators based on the economic data.

13. The computer system of claim 10, wherein the determining the estimated wholesale auction price is based further on a time series model.

14. The computer system of claim 10, wherein the determining the discount factor includes:
selecting the discount factor from a set of discount factors, each discount factor in the set of discount factors being associated at least with a respective vehicle classification, based on a match between the respective vehicle classification associated with the selected discount factor and a vehicle classification of the target vehicle.

15. The computer system of claim 14, wherein
each discount factor in the set of discount factors is further associated with a respective credit rating, and
the selecting the discount factor is based further on a match between a credit rating of an owner of the target vehicle and the respective credit rating associated with the selected discount factor.

16. The computer system of claim 14, wherein
each discount factor in the set of discount factors is further associated with a seasonality classification, and
the selecting the discount factor is based further on a match between a seasonality classification of a specified auction time and the respective seasonality classification associated with the selected discount factor, the specified auction time being a time at which the estimated post-repossession auction price is applicable.

17. The computer system of claim 10, wherein
the plurality of input variables include auction time, and
the determining the estimated wholesale auction price is based further on a specified auction time, the specified auction time being a time at which the estimated post-repossession auction price applicable.

18. The computer system of claim 10, wherein the operations further include:
receiving, from a user device over a communication network, a request to compute the post-repossession auction price of the target vehicle, the request identifying the target vehicle; and
after the determining the estimated post-repossession auction price, transmitting a response to the user device indicative of the estimated post-repossession auction price.

19. A non-transitory computer readable memory, comprising instructions that are executable by at least one processor of a computer system to perform operations including:
obtaining wholesale auction price data indicative of wholesale auction prices and vehicle attribute values of a plurality of vehicles;
grouping the plurality of vehicles into a plurality of vehicle groups, each of the plurality of vehicle groups associated with a respective plurality of characteristics, and each of the plurality of vehicle groups being a set of vehicles having the respective plurality of characteristics;
determining a plurality of regression models respectively based on the plurality of vehicle groups, each of the plurality of regression models being configured to output an estimated wholesale auction price as a function of a plurality of input variables, the plurality of input variables including one or more vehicle attributes and one or more economic indicators;
training each of the plurality of regression models using a machine learning algorithm, and using the respective vehicle group of the plurality of vehicle groups as a training set;
storing the plurality of regression models on the memory;
receiving, from a user device over a communication network, a request to compute a post-repossession auction price of a target vehicle, the request identifying the target vehicle;
obtaining information describing the target vehicle, the information being indicative of target-vehicle values for the one or more vehicle attributes;
identifying a regression model from amongst the plurality of regression models that is associated with a characteristic possessed by the target vehicle;
accessing the identified regression model in the memory of the computer system and, based on the target-vehicle values and values for the one or more economic indicators, determining an estimated wholesale auction price of the target vehicle using the identified regression model;
determining a discount factor representing an expected discount of the post-repossession auction price of the target vehicle from the estimated wholesale auction price;
determining an estimated post-repossession auction price of the target vehicle based on the estimated wholesale auction price and the determined discount factor; and
transmitting a response to the user device indicative of the estimated post-repossession auction price.

\* \* \* \* \*